US010812856B2

(12) United States Patent
Nguyen et al.

(10) Patent No.: US 10,812,856 B2
(45) Date of Patent: Oct. 20, 2020

(54) DYNAMIC ADVERTISEMENT INSERTION

(71) Applicant: The DIRECTV Group, Inc., El Segundo, CA (US)

(72) Inventors: Hai Nguyen, Torrance, CA (US); Binny Asarikuniyil, Cerritos, CA (US); Sudheer Bandela, Torrance, CA (US); Heather Truong, Anaheim, CA (US)

(73) Assignee: DIRECT TV GROUP, INC., El Segundo, CA (US)

( * ) Notice: Subject to any disclaimer, the term of this patent is extended or adjusted under 35 U.S.C. 154(b) by 0 days.

(21) Appl. No.: 16/249,091

(22) Filed: Jan. 16, 2019

(65) Prior Publication Data
US 2019/0149876 A1 May 16, 2019

Related U.S. Application Data

(63) Continuation of application No. 15/460,831, filed on Mar. 16, 2017, now Pat. No. 10,187,689.

(51) Int. Cl.
| | |
|---|---|
| *H04N 21/433* | (2011.01) |
| *H04N 21/442* | (2011.01) |
| *H04N 21/81* | (2011.01) |
| *H04N 21/431* | (2011.01) |
| *H04N 21/44* | (2011.01) |
| *H04N 21/4545* | (2011.01) |

(52) U.S. Cl.
CPC ..... *H04N 21/4331* (2013.01); *H04N 21/4316* (2013.01); *H04N 21/4334* (2013.01); *H04N 21/44008* (2013.01); *H04N 21/44222* (2013.01); *H04N 21/45455* (2013.01); *H04N 21/812* (2013.01)

(58) Field of Classification Search
None
See application file for complete search history.

(56) References Cited

U.S. PATENT DOCUMENTS

| 7,773,855 B1 | 8/2010 | Markman et al. |
| 8,707,182 B2 | 4/2014 | Bassali et al. |
| 9,165,604 B2 | 10/2015 | Plotnick et al. |
| 9,426,524 B2 | 8/2016 | Zalewski |
| 2002/0083439 A1 | 6/2002 | Eldering |
| 2003/0076347 A1* | 4/2003 | Barrett ............. H04N 7/163 715/719 |
| 2004/0083484 A1 | 4/2004 | Annon Ryal |

(Continued)

*Primary Examiner* — Omar S Parra
(74) *Attorney, Agent, or Firm* — Baker Botts, LLP (57) ABSTRACT

In one embodiment, a set-top box records playback content. The playback content comprises at least one frame that displays first media content and a first advertisement simultaneously. Moreover, the first advertisement is associated with an expiry date. The set-top box receives a selection to view the playback content on a viewing date and determines that the viewing date is past the expiry date associated with the first advertisement. When the viewing date is past the expiry date associated with the first advertisement, the set-top box updates the playback content by replacing the first advertisement in the at least one frame of the playback content with a second advertisement. The set-top box communicates the updated playback content to a display device. The updated playback content comprises at least one frame that displays media content and the second advertisement simultaneously.

17 Claims, 4 Drawing Sheets

(56) References Cited

U.S. PATENT DOCUMENTS

| | | | |
|---|---|---|---|
| 2005/0166224 A1* | 7/2005 | Ficco | H04H 20/106 |
| | | | 725/35 |
| 2006/0222319 A1 | 10/2006 | Russ | |
| 2006/0222335 A1 | 10/2006 | Russ | |
| 2007/0136742 A1 | 6/2007 | Sparrell | |
| 2008/0066106 A1 | 3/2008 | Ellis | |
| 2008/0152300 A1* | 6/2008 | Knee | G11B 27/005 |
| | | | 386/250 |
| 2009/0210899 A1* | 8/2009 | Lawrence-Apfelbaum | |
| | | | H04L 12/2801 |
| | | | 725/34 |
| 2010/0251289 A1* | 9/2010 | Agarwal | H04N 7/16 |
| | | | 725/34 |
| 2011/0078002 A1 | 3/2011 | Leary et al. | |
| 2011/0178853 A1* | 7/2011 | Karaoguz | G06Q 30/02 |
| | | | 705/14.4 |
| 2013/0117102 A1 | 5/2013 | Barbieri et al. | |
| 2013/0219424 A1 | 8/2013 | Lechner et al. | |
| 2016/0212455 A1* | 7/2016 | Manna | G06Q 30/02 |

\* cited by examiner

| Advertisement Indicator | Dimensions (height % x width %) | Topic | Duration | Number of Times Viewed | Interactive Capability | Expiry Date |
|---|---|---|---|---|---|---|
| Advertisement A | 20% x 50% | Exercise | 15 seconds | 0 | Yes | Expired |
| Advertisement B | 10% x 50% | Fashion | 12 seconds | 1 | Yes | Not Passed |
| Advertisement C | 10% x 50% | Team A | 10 seconds | 0 | Yes | Not Passed |
| Advertisement D | 10% x 50% | Clothing | 5 seconds | 3 | No | Not Passed |

DYNAMIC ADVERTISEMENT INSERTION

RELATED APPLICATION

This application is a continuation under 35 U.S.C. § 120 of U.S. application Ser. No. 15/460,831 filed on Mar. 16, 2017 and entitled Dynamic Advertisement Insertion, incorporated herein by reference.

TECHNICAL FIELD

The present disclosure generally relates to inserting an advertisement into playback content, and, in particular, to dynamically inserting an advertisement into playback content.

BACKGROUND

Users may program a set-top box to record playback content to view at a later time. The playback content may include one or more frames that display media content and an advertisement simultaneously. The user may view the recorded playback content at a later time.

SUMMARY OF PARTICULAR EMBODIMENTS

According to embodiments of the present disclosure, disadvantages and problems associated with displaying recorded advertisements through a set-top box (STB) at a later date may be reduced or eliminated.

In one embodiment, a set-top box records playback content. The playback content comprises at least one frame that displays first media content and a first advertisement simultaneously. Moreover, the first advertisement is associated with an expiry date. The set-top box receives a selection to view the playback content on a viewing date and determines that the viewing date is past the expiry date associated with the first advertisement. When the viewing date is past the expiry date associated with the first advertisement, the set-top box updates the playback content by replacing the first advertisement in the at least one frame of the playback content with a second advertisement. The set-top box communicates the updated playback content to a display device. The updated playback content comprises at least one frame that displays media content and the second advertisement simultaneously.

Other aspects of the present disclosure will be readily apparent to one skilled in the art from the following figures, descriptions, and claims.

BRIEF DESCRIPTION OF THE DRAWINGS

To assist in understanding of present disclosure, reference is now made to the following description taken in conjunction with the accompanying drawings, in which.

DESCRIPTION OF EXAMPLE EMBODIMENTS

Embodiments of the present disclosure and its advantages are best understood by referring to FIGS. 1-4, like numerals being used for like and corresponding parts of the various drawings.

Viewing an advertisement in recorded playback content at a later time may be problematic, because the advertisement may be outdated or not relevant to the user. Exacerbating this issue, STB may not be able to record the user's interaction with the advertisement.

Dynamically inserting advertisements into playback content may improve the relevancy of displayed advertisements. To improve the user experience, a STB may identify a relevant advertisement by analyzing the viewing history of the user. In addition, to unobtrusively replace a first advertisement, the STB may identify a second advertisement that has a similar time duration and dimensions to the first advertisement. In addition, to reduce the complexity of users separately searching for relevant information regarding an advertisement, the STB may communicate an interactive advertisement that performs actions based on a user's interaction with the advertisement. Moreover, to improve the functionality of the STB, the STB may calculate analytics of the user activity in relation to the display of the advertisement on a display device.

Figure 1:
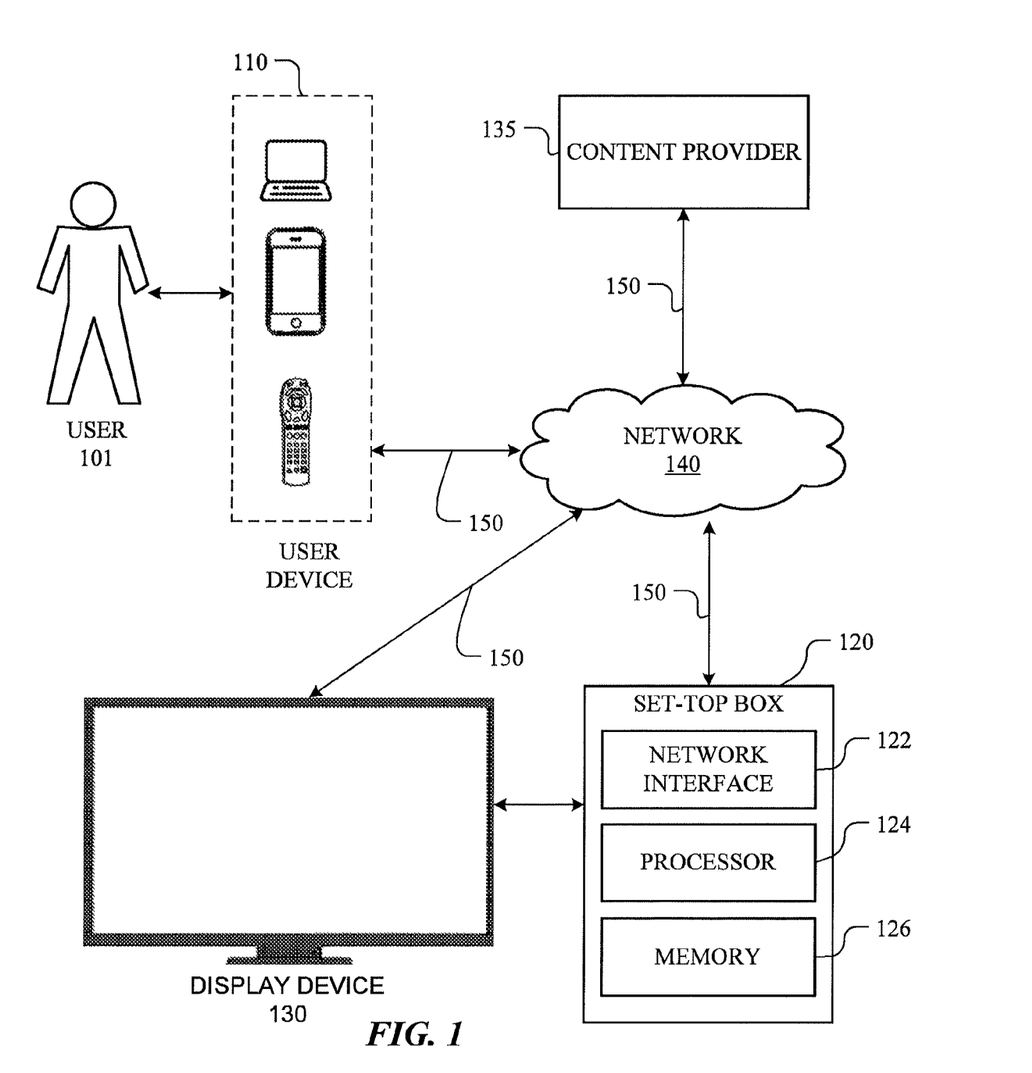
FIG. 1 illustrates an example network environment associated with dynamically inserting advertisements into playback content.

FIG. 1 illustrates an example network environment 100 associated with dynamically inserting advertisements into playback content. Network environment 100 includes a user 101, a user device 110, STB 120, display device 130, and content provider 135 connected to each other by a network 140. Although FIG. 1 illustrates a particular arrangement of user 101, user device 110, STB 120, display device 130, content provider 135, and network 140, this disclosure contemplates any suitable arrangement of user 101, user device 110, STB 120, display device 130, content provider 135, and network 140. As an example, two or more of user devices 110, STB 120, display devices 130, and content providers 135 may be connected to each other directly, bypassing network 140. As another example, two or more of user devices 110, STB 120, display devices 130, and content provider 135 may be physically or logically co-located with each other in whole or in part. Moreover, although FIG. 1 illustrates a particular number of users 101, user devices 110, STB 120, display devices 130, content providers 130, and networks 140, this disclosure contemplates any suitable number of users 101, user devices 110, STBs 120, display devices 130, content providers 135, and networks 140. As an example, network environment 100 may include multiple users 101, user devices 110, STBs 120, display devices 130, content providers 135, and networks 140.

In particular embodiments, user 101 may be an individual (human user), an entity (e.g., an enterprise, business, or third-party application), or a group (e.g., of individuals or entities) that interacts or communicates with STB 120 through user device 110. User 101 may navigate a program guide, select playback content to record, view the playback content, and perform other interactive functions for viewing playback content using STB 120. Typically, user 101 will view the program guide and perform other interactive functions for viewing playback content by viewing a visual representation of the programming guide and functions on display device 130.

User device 110 may access STB 120 directly, via network 140, or via a third-party system. As an example, user device 110 may access content provider 135 via STB 120. Typically, user 101 utilizes user device 110 to interact with STB 120. In certain embodiments, user 101 must log in and authenticate a user identification and/or password before user device 110 is able to access and communicate with STB 120. User device 110 may be any suitable computing device, such as, for example, a remote control, a personal computer, a laptop computer, a cellular telephone, a smartphone, a tablet computer, or an augmented/virtual reality device. User device 101 may also include a user interface, such as a keypad, a display, a microphone, or other appropriate terminal equipment for use by user 101. In some embodiments, an application executed by user device 110 may perform the functions described herein. User device 110 may be implemented using any suitable type of processing system and may include any suitable combination of hardware, firmware, and software. Each user device 110 may include any appropriate number of input devices, output devices, mass storage media, processors, memory, or other suitable components for receiving, processing, storing, and communicating data.

STB 120 is generally a device that provides interactive features such that user 101 may select a recording for a playback content; access, record, or play a previously recorded playback content; and interact with one or more advertisements displayed on display device 130. In particular embodiments, STB 120 may be one or more network-addressable computing devices that can receive input, generate audio and/or video output for display, and communicate with user device 110. STB 120 may also receive input from content provider 135 and communicate audio and/or video output for display on display device 130. For example, STB 120 may receive radio frequency analog television input, digital television input, satellite television input, and/or any other suitable type of input that contains a program guide. STB 120 may also receive the program guide from content provider 135.

The program guide may be an application that provides a list of current and scheduled programs that is or will be available on each channel, and, sometimes, a short summary or commentary for each program. Typically, a program guide allows user 101, through an interactive diagram displayed on display device 130, to schedule a recording of playback content. User 101 may select a scheduled broadcast in the program guide to record as playback content for user 101 to view at a later time. STB 120 may include a channel device, an ultra-high frequency (UHF) converter, a cable converter box, a closed captioning box, a digital television adapter, an integrated receiver/decoder, a hybrid box, an Internet Protocol Television (IPTV) receiver, and/or any other suitable device that records playback content and communicates an updated playback content to display device 130.

Playback content consists of television, radio, images, videos, audio, or any other items that may be displayed using display device 130 connected to STB 120. Playback content may be communicated in typical video and/or audio format or may be communicated in a compressed form. Playback content may include one or more frames that indicate the audio and/or video to display when display device 130 displays the one or more frames.

The frames of playback content may include media content. The media content can include a show, movie, series, or any other type of content that is the main programming of playback content. For example, if user 101 records a football game as playback content, the one or more frames of the playback content may include the football game itself (i.e., the media content).

The frames of playback content may also include a first advertisement. The first advertisement may include any type of image, an overlay to the media content, video, or audio that is displayed simultaneously with the media content. The first advertisement may be displayed in the foreground, background, side-by-side, or any other type of view such that first advertisement and media content are displayed simultaneously. Continuing the example above, if user 101 records a football game, any content (e.g., a promotion for an upcoming show) that is displayed simultaneously with the football game in a frame of the playback content may be a first advertisement.

In certain embodiments, the first advertisement is associated with an expiry date. The expiry date may be any preset or adaptive time related to the first advertisement. For example, a first advertisement may be associated with a specific expiry date when the first advertisement is no longer relevant. An example first advertisement with a specific expiry date may be a broadcast time of a television program. As another example, a first advertisement may be associated with an adaptive expiry date. STB 120 may determine an adaptive expiry date based on a number of times user 101 has viewed the first advertisement, type of the first advertisement, or any other characteristics that are used to determine the relevancy of first advertisement to user 101. As an example of an adaptive expiry date, STB 120 may determine that user 101 has previously viewed the first advertisement four times. STB 120 may then set adaptive expiry date to a date in the near future (or even a past date) such that STB 120 may limit potential viewing of the first advertisement. In certain embodiments, an expiry date is set by content provider 135 and/or the advertiser of the first advertisement.

In certain embodiments, content provider 135 may communicate the first advertisement and media content together as one playback content signal to STB 120. In alternate embodiments, content provider 135 may communicate the first advertisement using a different signal from the signal communicating media content. STB 120 may combine the first advertisement and media content into playback content for display device 130 to display. The first advertisement may be communicated as an image, animation, audio file, an overlay to the media content, or any other type of media that allows the first advertisement to be displayed simultaneously with the media content in at least one frame of the playback content.

In certain embodiments, STB 120 may determine a first advertisement in one or more frames of the playback content. STB 120 may perform visual and/or audio analysis to determine that an advertisement is part of a frame of the playback content. For example, STB 120 may perform object recognition on the frames of the playback content to find and identify objects, such as an advertisement, in at least one frame of the playback content. STB 120 may perform the object recognition analysis at the time of recording, at the time of playback, or any time such that STB 120 recognizes an advertisement in at least one frame of the playback content.

The first advertisement may be associated with a first advertisement duration and first advertisement dimensions. The first advertisement duration may be a length of time the first advertisement plays. The first advertisement duration may indicate a specific length of time or may be a time indication in relation to the media content (e.g., time segment 12 seconds to 30 seconds of the media content). The first advertisement dimensions may indicate a length, height, and/or a position. The first advertisement dimensions may indicate a fixed length and height or a variable length and/or height based on the aspect ratio of display device 130.

In the illustrated embodiment, STB 120 includes network interface 122, processor 124, and memory 126. Network interface 122 facilitates communication between processor 124, network 140, or other components of network environment 100. Network interface 122 may facilitate communication over portions of network 140 or over a separate data network. For example, network interface 122 may communicate playback content to one or more display device 130. In particular embodiments, network interface 122 includes or represents one or more network interface cards (NICs).

Processor 124 may represent or include any form of processing components, including dedicated microprocessors, general-purpose computers, or other devices capable of processing electronic information. Examples of processor 124 include field-programmable gate arrays (FPGAs), programmable microprocessors, digital signal processors (DSPs), application-specific integrated circuits (ASICs), and any other suitable specific- or general-purpose processors. For example, processor 124 may determine a second advertisement to replace the first advertisement in the frames of the playback content. As another example, processor 124 may record analytics during the display of the second advertisement. Although FIG. 1 illustrates, for the sake of simplicity, an embodiment of STB 120 that includes a single processor 124, STB 120 may include any number of processors 124 configured to interoperate in any appropriate manner.

Memory 126 stores processor instructions and/or any other data utilized by STB 120 during operation. Memory 126 may include any collection and arrangement of volatile or non-volatile, local or remote devices suitable for storing data, such as random access memory (RAM), read only memory (ROM), magnetic storage, optical storage, or any other suitable type of data storage components. For example, memory 126 may store the recorded playback content for user 101 to view at a later time. Although shown as a single element in FIG. 1, memory 126 may include one or more physical components local to or remote from STB 120.

STB 120 may implement the techniques described herein using customized hard-wired logic, one or more ASICs or FPGAs, firmware and/or program logic which in combination with the computer system causes or programs STB 120 to be a special-purpose machine. According to one embodiment, the techniques herein are performed by STB 120 in response to processor 122 executing one or more sequences of one or more instructions contained in memory 126. Such instructions may be read into memory 126 from another storage medium. Execution of the sequences of instructions contained in memory 126 causes processor 12 to perform the process steps described herein. In alternative embodiments, hard-wired circuitry may be used in place of or in combination with software instructions.

Display device 130 generally receives audio and/or video information from STB 120 and outputs the audio and/or video information for viewing by one or more users 101. Display device 130 may be any device capable of displaying audio and/or video information for the one or more frames of the playback content. For example, display device 130 may be a television, a smart television, a computer monitor, a smart phone, a desktop, a laptop, a projector, an augmented reality device, a virtual reality device, or any other suitable type of device having a display. Display device 130 may receive playback content and/or updated playback content from STB 120.

Content provider 135 generally communicates the program guide to STB 120. For example, content provider 135 may communicate playback content to STB 120 via network 140. In some embodiments, content provider 135 communicates playback content directly to STB 120. In some embodiments, content provider 135 may communicate playback content to STB 120 via radio frequency signals transmitted through coaxial cables. Content provider 135 may communicate the playback content via light pulses through fiber-optic cables, over the air radio waves, through network 140 (e.g., through the internet or telephone network), or any other suitable mode of transmission. In certain embodiments, content provider 135 communicates the second advertisement to STB 120.

This disclosure contemplates any suitable network 140. As an example, one or more portions of network 140 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 140 may include one or more networks 140.

Communication links 150 may connect user device 110, STB 120, display device 130, and content provider 135 to network 140 or to each other. This disclosure contemplates any suitable communication links 150. In particular embodiments, one or more communication links 150 include one or more wireline (such as, for example, Digital Subscriber Line (DSL) or Data Over Cable Service Interface Specification (DOCSIS)), wireless (such as, for example, 2G, 3G, 4G, or 5G cellular, Wi-Fi, or Worldwide Interoperability for Microwave Access (WiMAX)), or optical (such as, for example, Synchronous Optical Network (SONET) or Synchronous Digital Hierarchy (SDH)) links. In particular embodiments, one or more communication links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another communication link 150, or a combination of two or more such communication links 150. Communication links 150 need not necessarily be the same throughout network environment 100. One or more first communication links 150 may differ in one or more respects from one or more second communication links 150.

In an exemplary embodiment of operation, STB 120 records playback content. STB 120 may record the playback content while the playback content is being broadcast. STB 120 may also record playback content as a background operation. Playback content may be stored on STB 120 and/or content provider 135. Playback content may consist of one or more frames that indicate the video and/or audio to display while playing the frames. Generally, user 101 instructs STB 120 to record a specific playback content either during the present time or future time. STB 120 may then start recording or schedule a recording of the specified playback content. In certain embodiments, STB 120 stores playback content in memory 126.

Playback content may include media content and a first advertisement. The first advertisement may be displayed simultaneously with the media content in the one or more frames of the playback content. In addition, the first advertisement is associated with an expiry date. The expiry date may be any preset or adaptive time related to the first advertisement. The first advertisement may also be associated with a first advertisement duration and first advertisement dimensions.

STB 120 may also receive a selection to view the playback content on a viewing date. User 101 may provide an indication to STB 120 to play the playback content on user device 110. The viewing date may be associated with the time and/or date that STB 120 receives a selection to view the playback content or scheduled to view the playback content.

STB 120 may then determine whether the viewing date is past the expiry date associated with the first advertisement. In certain embodiments, STB 120 determines whether the viewing date is a later date than the expiry date.

If the viewing date is past the expiry date associated with the first advertisement, STB 120 may update the playback content by replacing the first advertisement in one or more frames of the playback content with a second advertisement. In certain embodiments, content provider 120 may communicate the second advertisement to STB 120. As described in further detail below, STB 120 may determine a second advertisement using some, none, or all of the following criteria:

a comparison of a second advertisement duration and second advertisement dimensions to a first advertisement duration and first advertisement dimensions; and/or     an analysis of a viewing history associated with user 101.

Comparing a Second Advertisement Duration and Second Advertisement Dimensions to a First Advertisement Duration and First Advertisement Dimensions The second advertisement may be associated with a second advertisement duration and second advertisement dimensions. The second advertisement duration may be a length of time that second advertisement plays. For example, the second advertisement duration may indicate a specific length of time. The second advertisement dimensions may indicate a length, height, and/or a position to display the second advertisement. The second advertisement dimensions may indicate a fixed length and/or height or a variable length and/or height based on the aspect ratio of display device 130.

STB 120 may compare a second advertisement duration and second advertisement dimensions to a first advertisement duration and first advertising dimensions, respectively, to determine the second advertisement. In particular, STB 120 may find a second advertisement that is similar duration length and dimensions to the first duration length and first advertising dimensions. In certain embodiments, STB 120 may find a second advertisement and a third advertisement that can be combined to form a similar duration of time to the first advertisement duration. In alternative embodiments, STB 120 may duplicate a second advertisement, shorten a second advertisement, or modify the dimensions of second advertisement to match a similar duration of time and/or dimensions of first advertisement.

Analyzing Viewing History Associated with User 101

STB 120 may determine a second advertisement based on analysis of the viewing history of user 101 viewing history or certain preferences indicated by user 101. STB 120 may analyze the viewing history (e.g., recorded programs, live streamed programs, genre of programs, actors/actresses of programs) to determine advertisement content that may interest user 101. For example, STB 120 may analyze the viewing history of user 101 to determine that user 101 watches sports games involving Team A. STB 120 may then identify a second advertisement content that is associated with Team A.

The method for determining a second advertisement may involve the usage of a set of functions (e.g., scalar functions) associated with each criteria. Moreover, the second advertisement determination may include a number of additional determination techniques, such as statistical regression analysis and statistical classifiers, such as neural networks, decision trees, Bayesian classifiers, fuzzy logic-based classifiers, machine learning (e.g., deep learning), and statistical pattern recognition.

STB 120 may update the playback content by replacing the first advertisement in one or more frames of the playback content with a second advertisement. In certain embodiments, STB 120 removes the first advertisement from one or more frames of the playback content and replaces the first advertisement with the second advertisement in the one or more frames. In alternate embodiments, STB 120 may overlay the second advertisement over the first advertisement for one or more frames in the updated playback content, such that display device 130 will only display the second advertisement in the one or more frames of the updated playback content.

STB 120 may communicate the updated playback content to display device 130. In particular, the updated playback content may include one or more frames that include the second advertisement and the media content. When display device 130 displays the one or more frames of updated playback content, display device 130 may display the second advertisement simultaneously with the media content. The second advertisement may be displayed in the foreground, background, side-by-side, or any other type of view such that first advertisement and media content are displayed simultaneously. In certain embodiments, STB 120 may communicate accompanying characteristics of the second advertisement such that display device 130 displays the second advertisement in the one or more frames of updated playback content correctly. For example STB 120 may communicate a position to display second advertisement such that it overlays the first advertisement. Display device 130 may display second advertisement based on the received characteristics.

The second advertisement may include an interactive option where user 101 may interact with the second advertisement. An interaction may include an event from user 101 that is communicated from user device 110 to STB 120. For example, user 101 may utilize user device 110 to select the interactive option associated with the second advertisement or may expand the second advertisement by interacting with the second advertisement. As another example, the second advertisement may perform an animation when user 101 interacts with the second advertisement. Example interactions may also include hovering a cursor over the second advertisement on display device 130, selecting a scroll button associated with the second advertisement, a keyboard entry, a selection by user device 110, or any other event indicating an interaction between user 101 and STB 120.

In certain embodiments, the second advertisement is associated with second media content. For example, a second advertisement may be associated with a premiere showing of television series. Second media content can include a show, movie, series, or any other type of content that is different than the first media content. Typically, second advertisement is an advertisement for the second media content. The second advertisement may comprise a reference or a link that, when selected, causes STB 120 to perform an action related to the second media content.

STB 120 may receive a selection of the interactive option associated with the second advertisement. For example, the second advertisement may include an option to record the premiere showing of the television series. In response to receiving the selection of the interactive option, STB 120 may record the second media content. In the above example, STB 120 may record the premiere showing of the series in response to receiving a selection by user 101 of the option to record the premiere showing of the television series.

STB 120 may also record analytics during the display of the second advertisement simultaneously with the media content. As described in further detail below, the analytics may include some, none, or all of the following traits:
 a position of the second advertisement;
 a time length that the second advertisement was displayed; and/or
 one or more actions selected by user 101 while the second advertisement was displayed.

A Position of the Second Advertisement

STB 120 may record analytics pertaining to a position of the second advertisement. The position of the second advertisement may include the coordinates of the second advertisement on the display, the positional relationship of the second advertisement to the media content displayed, an item that blocks the display of the second advertisement (e.g., a menu select guide that is displayed over second advertisement), or any other traits that may provide analytics pertaining to the positioning of the second advertisement.

A Time Length that the Second Advertisement was Displayed

STB 120 may record analytics pertaining to a time length of the second advertisement. The time length of the second advertisement may include the time length that a second advertisement was displayed. The time length may be different than the second advertisement duration as user 101 may skip past the second advertisement, may pause during the second advertisement, or may re-watch the second advertisement.

One or More Actions Selected by User 101 while Second Advertisement was Displayed STB 120 may record analytics pertaining to one or more actions selected while second advertisement was displayed. In particular, STB 120 may record the timing and selection of actions by user 101 while display device 130 displays the second advertisement. STB 120 actions include fast forwarding, rewinding, pausing, selecting, or any other type of action that allows user 101 to interact with STB 120.

STB 120 and/or content provider 135 may calculate metrics based on the recorded analytics. For example STB 120 and/or content provider 135 may calculate the amount of times an advertisement is displayed, length of time an advertisement is displayed, activity surrounding an advertisement, or any other analytics associated with the advertisement. STB 120 and/or content provider 135 may store the calculated metrics in memory 126 or may communicate the calculated metrics to another component in network environment 100.

Modifications, additions, or omissions may be made to network environment 100. For example, user device 110 may include any number of user devices 110. Furthermore, the components of network environment 100 may be integrated or separated. For example, STB 120 and content provider 135 may be incorporated into a single component.

Figure 2:
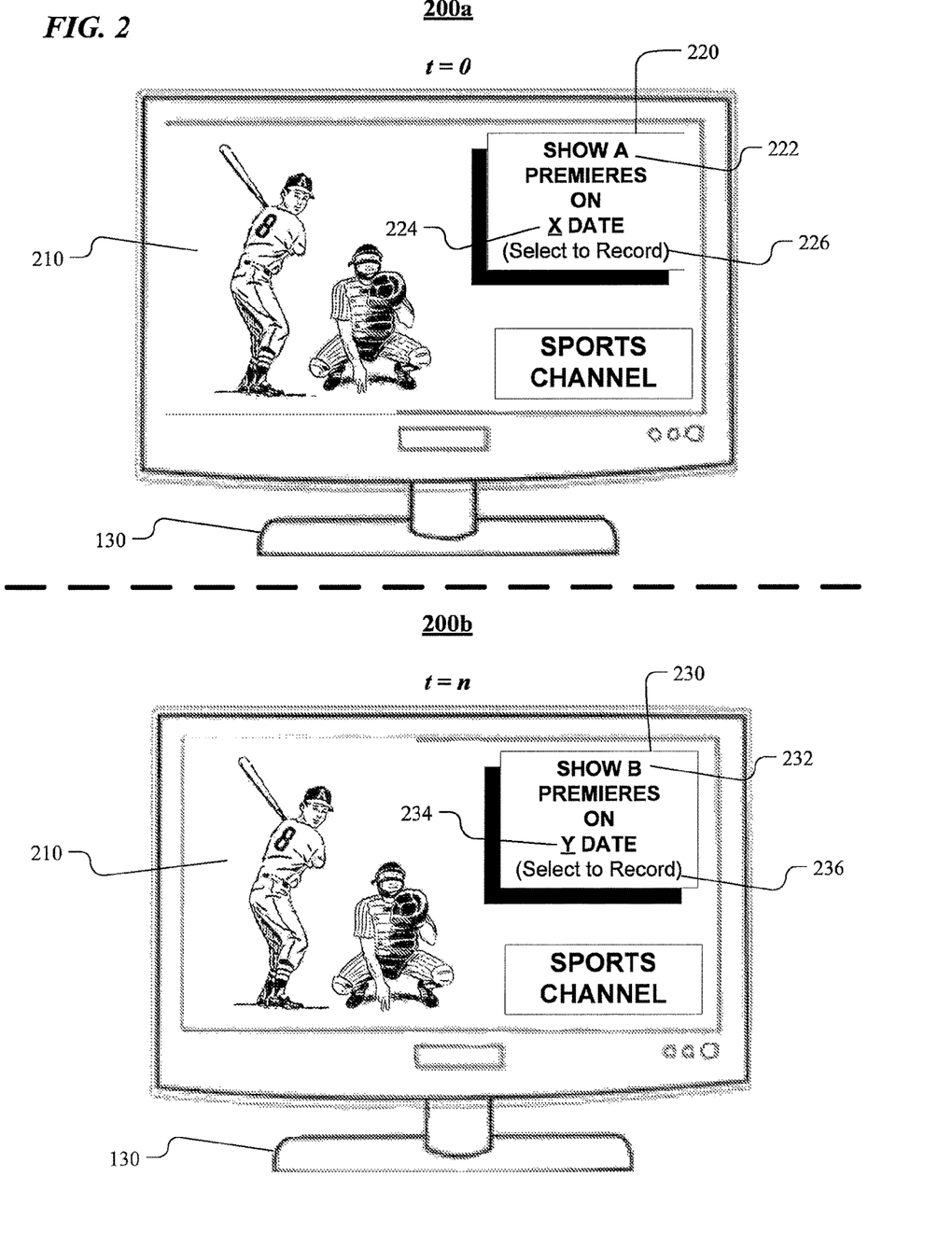
FIG. 2 illustrates a playback content frame at the time of recording and an updated playback content frame at a later viewing time.

FIG. 2 illustrates playback content frame 200*a* at the time of recording (time t=0) and updated playback content frame 200*b* at a later viewing time (time t=n, where n indicates a time reference after the time of recording). For example, user 101 may select playback content (that contains playback content frame 200*a*) to have STB 120 record and then user 101 may view updated playback content (that contains playback content frame 200*b*) at a later time. Playback content frame 200*a* and/or updated playback content frame 200*b* may be displayed on display device 130.

Playback content frame 200*a* may include media content 210 and first advertisement 220. In the illustrated embodiment, media content 210 may be a televised baseball game playing on the "Sports Channel." First advertisement 220 may be an advertisement for advertising content 222 (e.g., "Show A" premiering on X date). Expiry date 224 may be the premiere date of advertising content 222. In addition, first advertisement 220 may include selectable button 226 that allows user 101 to interact with the advertisement (e.g., select the advertisement to record the media content related to advertising content 222).

First advertisement 220 may include a duration of time (e.g., a time period of 10 seconds) and dimensions associated with first advertisement 220. Moreover, first advertisement may be associated with an expiry date. In the illustrated example, the expiry date associated with the first advertisement may be X date (i.e., the date "Show A" premieres).

At time t=n, user 101 may view updated playback content frame 200*b*. Updated playback content frame 200*b* consists of the same media content 210 as playback content frame 200*a*. To determine an advertisement to display, STB 120 determines the expiry date associated with first advertisement 220. In the illustrated embodiment, the expiry date of first advertisement 220 is X date. In the illustrated embodiment, X date is a date that has expired when time t=n.

STB 120 then determines a second advertisement 230 to replace first advertisement 220. In certain embodiments, STB 120 determines second advertisement 230 based in part on the time duration and dimensions associated with first advertisement 220. In certain embodiments, STB 120 may analyze a viewing history associated with user 101 to determine second advertisement 230.

STB 120 may update playback content frame 200*a* by replacing first advertisement 220 with second advertisement 230 to create updated playback content frame 200*b*. STB 120 may then communicate updated playback content 200*b* to display device 130. Updated playback content frame 200*b* may include second advertisement 230 that is simultaneously displayed with media content 210. In certain embodiments, STB 120 may receive second advertisement 230 from content provider 135.

Second advertisement 230 may be an advertisement for advertising content 232 (e.g., "Show B" premiering on Y date). Expiry date 234 may be the premiere date of advertising content 232. In addition, second advertisement 230 may include selectable button 236 that allows user 101 to interact with the advertisement (e.g., select the advertisement to record media content associated with advertising content 232).

Figure 3:
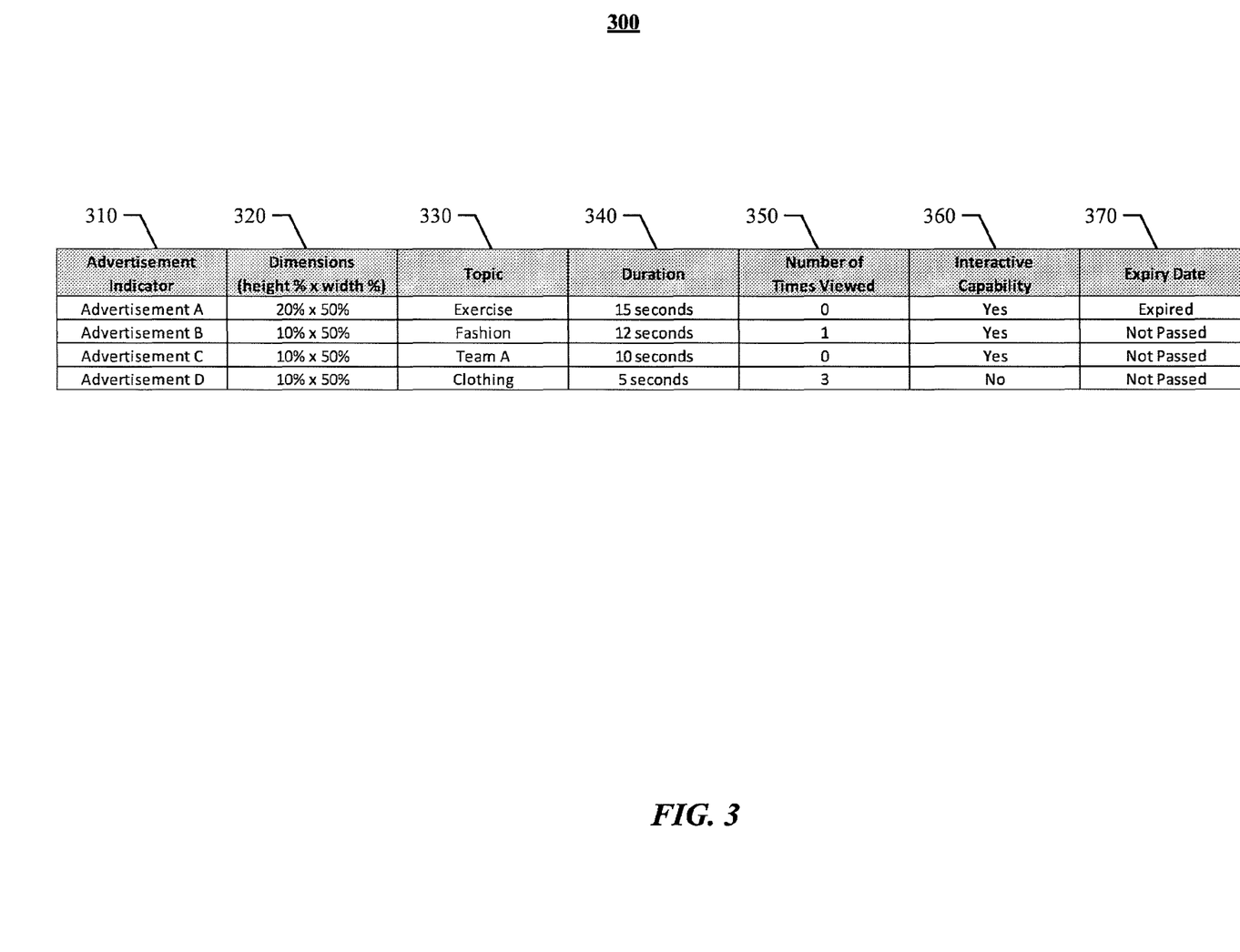
FIG. 3 illustrates an example advertisement table that may be stored on a set-top box.

FIG. 3 illustrates example advertisement table 300 that may be stored on STB 120 and/or content provider 135. Advertisement table 300 may contain a variety of columns that STB 120 utilizes to determine a second advertisement to replace the first advertisement. In the illustrated embodiment, advertisement table 300 may include the following columns: advertisement indicator column 310, dimensions column 320, topic column 330, duration column 340, number of times viewed column 350, interactive capability column 360, and expiry date column 370. Each column represents a characteristic associated with one or more advertisements.

STB 120 may determine a second advertisement by analyzing each column associated with the one or more advertisements. For example, STB 120 may replace a 10-second first advertisement with dimensions of 10% the height of the television display and 50% width of the television display. STB 120 may analyze a viewing history of user 101 to determine that user 101 likes Team A. Accordingly, STB 120 may select Advertisement C because the dimensions and time duration of Advertisement C are similar to the dimensions and time duration of the first advertisement. In addition, Advertisement C contains a type of advertisement that may be of particular interest to user 101 based on a viewing history of user 101.

Figure 4:
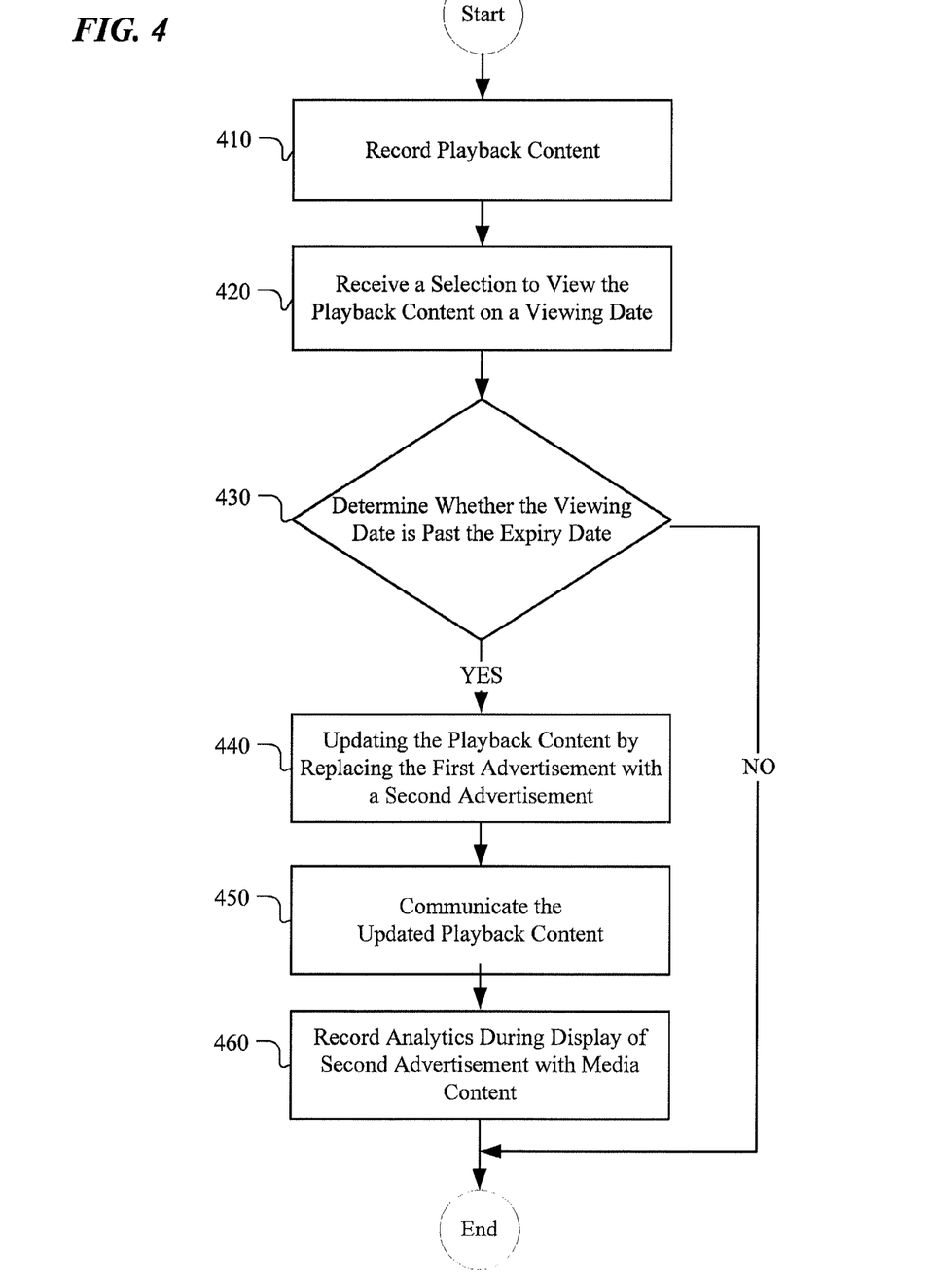
FIG. 4 illustrates an example method for dynamically inserting an advertisement into playback content.

FIG. 4 illustrates an example method 400 for dynamically inserting an advertisement into playback content.

The method begins at step 410 where STB 120 records playback content. STB 120 may record playback content while playback content is being broadcasted. Generally, user 101 instructs STB 120 to record specific playback content that is currently broadcasting or will be broadcasting in the future. STB 120 may start recording or schedule a recording of the specified playback content. In certain embodiments, STB 120 stores the playback content in memory 126.

One or more frames in the playback content may include media content and a first advertisement. The first advertisement is an advertisement that is displayed simultaneously with the media content for at least one frame of the playback content. The first advertisement may be displayed in the foreground, background, side-by-side, or any other type of view such that first advertisement and media content are displayed simultaneously.

In certain embodiments, the first advertisement is associated with an expiry date. The expiry date may be any preset or adaptive time related to the first advertisement. In certain embodiments, an expiry date is set by content provider 135 and/or the advertiser of the first advertisement.

The first advertisement may also be associated with a first advertisement duration and first advertisement dimensions. The first advertisement duration may be a length of time that first advertisement plays. The first advertisement duration may indicate a specific length of time or may be a time indication in relation to media content (e.g., time segment 12 seconds to 30 seconds of the media content). The first advertisement dimensions may indicate a length, height, and/or a position. The first advertisement dimensions may indicate a fixed length and height or a variable length and height based on the aspect ratio of display device 130.

At step 420, STB 120 receives a selection to view the playback content on a viewing date. User 101 may provide an indication to STB 120 to play the playback content on user device 110. The viewing date may be associated with the time and/or date that STB 120 receives a selection to view the playback content or scheduled to view the playback content.

At step 430, STB 120 determines whether the viewing date is past the expiry date associated with the first advertisement. If the viewing date is not past the expiry date associated with the first advertisement, the method ends and playback content with the first advertisement is displayed on display device 130. If the viewing date is past the expiry date associated with the first advertisement, the method proceeds to step 440.

At step 440, STB 120 updates the playback content by replacing the first advertisement in one or more frames of the playback content with a second advertisement. In certain embodiments, content provider 120 may communicate the second advertisement to STB 120. STB 120 may determine a second advertisement based in part on comparing a second advertisement duration and second advertisement dimensions to a first advertisement duration and first advertisement dimensions, respectively, and/or analyzing a viewing history associated with user 101.

At step 450, STB 120 may communicate the updated playback content to display device 130. The updated playback content includes at least one frame that simultaneously displays media content and the second advertisement. When display device 130 displays one or more frames of the updated playback content, the second advertisement is simultaneously displayed with the media content on display device 130. In certain embodiments, STB 120 may communicate characteristics of the second advertisement such that the second advertisement is displayed over the first advertisement. In alternate embodiments, STB 120 may remove the first advertisement from the frames of the playback content before updating the frames of the playback content with the second advertisement. STB 120 may replace the first advertisement with the second advertisement upon receiving a selection from user 101 to view the playback content on the viewing date or may replace the first advertisement with the second advertisement at the time that first advertisement is supposed to be displayed.

The second advertisement may include an interactive option where a user may interact with the second advertisement. In certain embodiments, the second advertisement is associated with second media content. STB 120 may receive a selection of the interactive option associated with the second advertisement. In response to receiving the selection of the interactive option, STB 120 may record the second media content.

At step 460, STB 120 may also record analytics during the display of the second advertisement simultaneously with the media content on display device 130. The analytics may include a position of the second advertisement; a time length that the second advertisement was displayed; and/or one or more actions selected while second advertisement was displayed.

Modifications, additions, or omissions may be made to method 400 depicted in FIG. 4. Method 400 may include more, fewer, or other steps. For example, STB 120 may record analytics while communicating the updated playback content to display device 130. Steps may also be performed in parallel or in any suitable order. While discussed as specific components completing the steps of method 400, any suitable component of network environment 100 may perform any step of method 400.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
    recording, by a set-top box, playback content comprising at least one frame that displays first media content and a first advertisement simultaneously, wherein the first advertisement is associated with first advertisement dimensions and the first advertisement dimensions indicate a first variable length and a first variable height based on an aspect ratio of the display device;
    receiving, by the set-top box, a selection to view the playback content;
    selecting, by the set-top box, a second advertisement from a plurality of advertisements, wherein the second advertisement is associated with second advertisement dimensions and the second advertisement dimensions indicate a second variable length and a second variable height based on the aspect ratio of the display device;
    comparing the second advertisement dimensions to the first advertisement dimensions;
    updating the playback content by replacing the first advertisement in the at least one frame of the playback content with at least the second advertisement; and
    communicating, to a display device, the updated playback content, wherein the updated playback content comprises at least one frame that displays the first media content and the second advertisement simultaneously.

2. The method of claim 1, further comprising selecting, by the set-top box, a third advertisement from the plurality of advertisements, the third advertisement associated with third advertisement dimensions, wherein:
    updating the playback content comprises replacing the first advertisement of the playback content with the second advertisement and the third advertisement; and
    combining the second advertisement and the third advertisement forms a similar duration of time to a duration of the first advertisement.

3. The method of claim 1, wherein updating the playback content comprises:
    duplicating the second advertisement to form a duplicated second advertisement; and
    replacing the first advertisement of the playback content with the second advertisement and the duplicated second advertisement.

4. The method of claim 1, further comprising shortening a duration of the second advertisement to match a duration of the first advertisement.

5. The method of claim 1, wherein interacting with the second advertisement causes the set-top box to initiate one or more of the following actions:
    expand the second advertisement; and
    perform an animation within the second advertisement.

6. The method of claim 1, further comprising receiving the second advertisement from a content provider.

7. One or more non-transitory computer-readable storage media embodying instructions that, when executed by a processor, cause the processor to perform operations comprising:
    recording playback content comprising at least one frame that displays first media content and a first advertisement simultaneously, wherein the first advertisement is associated with first advertisement dimensions and the first advertisement dimensions indicate a first variable length and a first variable height based on an aspect ratio of the display device;
    receiving a selection to view the playback content;
    selecting a second advertisement from a plurality of advertisements, wherein the second advertisement duration is associated with second advertisement dimensions and the second advertisement dimensions indicate a second variable length and a second variable height based on the aspect ratio of the display device;
    comparing the second advertisement dimensions to the first advertisement dimensions;
    updating the playback content by replacing the first advertisement in the at least one frame of the playback content with at least the second advertisement; and
    communicating, to a display device, the updated playback content, wherein the updated playback content comprises at least one frame that displays the first media content and the second advertisement simultaneously.

8. The one or more non-transitory computer-readable storage media of claim 7, the operations further comprising selecting a third advertisement from the plurality of advertisements, the third advertisement associated with third advertisement dimensions, wherein:
    updating the playback content comprises replacing the first advertisement of the playback content with the second advertisement and the third advertisement; and
    combining the second advertisement and the third advertisement forms a similar duration of time to a duration of the first advertisement.

9. The one or more non-transitory computer-readable storage media of claim 7, wherein updating the playback content comprises:
    duplicating the second advertisement to form a duplicated second advertisement; and
    replacing the first advertisement of the playback content with the second advertisement and the duplicated second advertisement.

10. The one or more non-transitory computer-readable storage media of claim 7, the operations further comprising shortening a duration of the second advertisement duration to match a duration of the first advertisement duration.

11. The one or more non-transitory computer-readable storage media of claim 7, wherein interacting with the second advertisement causes the processor to initiate one or more of the following actions:
    expand the second advertisement; and
    perform an animation within the second advertisement.

12. The one or more non-transitory computer-readable storage media of claim 7, the operations further comprising receiving the second advertisement from a content provider.

13. The one or more computer-readable storage media of claim 7, the operations further comprising shortening a duration of the second advertisement to match a duration of the first advertisement.

14. A system comprising one or more processors and a memory storing instructions that, when executed by the one or more processors, cause the one or more processors to perform operations comprising:

recording playback content comprising at least one frame that displays first media content and a first advertisement simultaneously, wherein the first advertisement is associated with first advertisement dimensions and the first advertisement dimensions indicate a first variable length and a first variable height based on an aspect ratio of the display device;

receiving a selection to view the playback content;

selecting a second advertisement from a plurality of advertisements, wherein the second advertisement duration is associated with second advertisement dimensions and the second advertisement dimensions indicate a second variable length and a second variable height based on the aspect ratio of the display device;

comparing the second advertisement dimensions to the first advertisement dimensions;

updating the playback content by replacing the first advertisement in the at least one frame of the playback content with at least the second advertisement; and communicating, to a display device, the updated playback content, wherein the updated playback content comprises at least one frame that displays the first media content and the second advertisement simultaneously.

15. The system of claim 14, the operations further comprising selecting a third advertisement from the plurality of advertisements, the third advertisement associated with third advertisement dimensions, wherein:

updating the playback content comprises replacing the first advertisement of the playback content with the second advertisement and the third advertisement; and combining the second advertisement and the third advertisement forms a similar duration of time to a duration of the first advertisement.

16. The system of claim 14, wherein updating the playback content comprises:

duplicating the second advertisement to form a duplicated second advertisement; and replacing the first advertisement of the playback content with the second advertisement and the duplicated second advertisement.

17. The system of claim 14, wherein interacting with the second advertisement causes the one or more processors to initiate one or more of the following actions:

expand the second advertisement; and perform an animation within the second advertisement.

* * * * *